United States Patent
Zhu et al.

(10) Patent No.: US 8,659,859 B1
(45) Date of Patent: Feb. 25, 2014

(54) ELECTROSTATIC DISCHARGE PROTECTION SCHEME FOR HIGH-DEFINITION MULTIMEDIA INTERFACE TRANSMITTERS

(75) Inventors: Xiaojun Zhu, Saratoga, CA (US); Guangjun He, Milpitas, CA (US)

(73) Assignee: Ambarella, Inc., Santa, Clara, CA (US)

( * ) Notice: Subject to any disclaimer, the term of this patent is extended or adjusted under 35 U.S.C. 154(b) by 451 days.

(21) Appl. No.: 12/815,929

(22) Filed: Jun. 15, 2010

(51) Int. Cl.
*H02H 9/00* (2006.01)
*H02H 3/22* (2006.01)

(52) U.S. Cl.
USPC .......................................... 361/56; 361/111

(58) Field of Classification Search
USPC ..................................... 361/56, 111; 257/355
See application file for complete search history.

(56) References Cited

U.S. PATENT DOCUMENTS 5,751,507 A * 5/1998 Watt et al. .................. 361/56
2007/0002508 A1 * 1/2007 Vanysacker et al. ......... 361/56

* cited by examiner

*Primary Examiner* — Rexford Barnie
*Assistant Examiner* — Christopher Clark
(74) *Attorney, Agent, or Firm* — Christopher P. Maiorana, PC

(57) ABSTRACT

An apparatus generally having a first circuit, a second circuit and a third circuit is disclosed. The first circuit may be configured to selectively switch a bonding pad to (i) a first rail of a power source and (ii) a discharge rail in response to an electrostatic discharge. The second circuit is generally configured to clamp the electrostatic discharge between the discharge rail and the first rail. The third circuit may be configured to bias the discharge rail to a second rail of the power source.

20 Claims, 4 Drawing Sheets

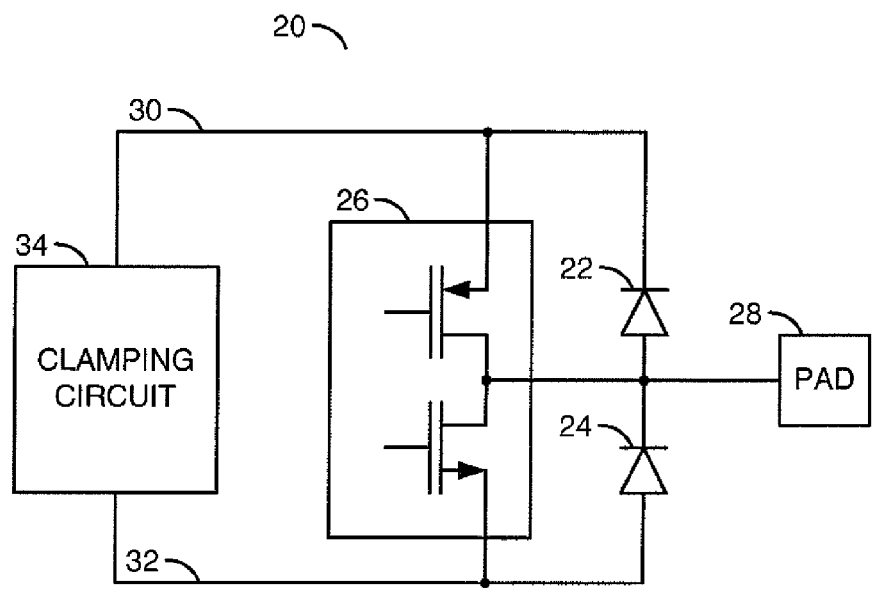
FIG. 1
CONVENTIONAL
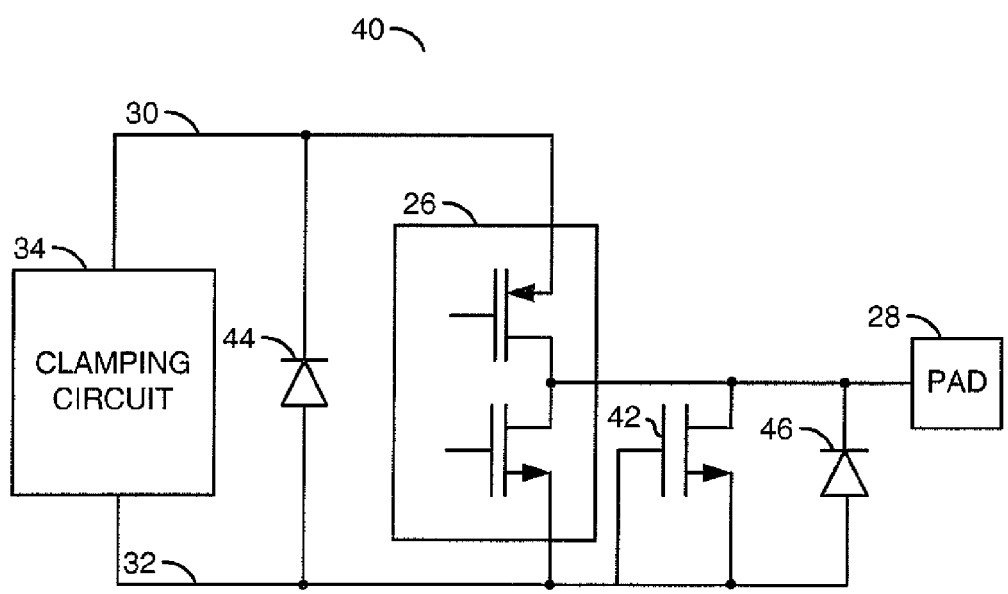
FIG. 2
CONVENTIONAL

ELECTROSTATIC DISCHARGE PROTECTION SCHEME FOR HIGH-DEFINITION MULTIMEDIA INTERFACE TRANSMITTERS

FIELD OF THE INVENTION

The present invention relates to a method and/or architecture for electrostatic discharge (ESD) protection generally and, more particularly, to an ESD protection scheme for High-Definition Multimedia Interface transmitters.

BACKGROUND OF THE INVENTION

Referring to FIG. 1, a block diagram of a conventional double diode electrostatic discharge (ESD) circuit 20 is shown. The double diodes 22 and 24 are an effective ESD protection scheme for an analog circuit 26 and are widely used. For a positive ESD zap at a pad 28 with respect to power rails 30 and 32, current passes from the pad 28 through the diode 22, the rail 30, a power clamp 34 and to the rail 32. For a negative ESD zap at the pad 28 with respect to the rail 32, current passes from the rail 30 through the power clamp 34, the rail 32, the diode 24 and to the pad 28.

The double diode approach does not work for some applications. A High-Definition Multimedia Interface (HDMI) (HDMI® is a registered trademark of HDMI Licensing, LLC, Sunnyvale, Calif.) includes a compliance test that specifies a minimum leakage from the pad 28 to either rail 30 or 32 while the system is powered down (i.e., rail 30=0 volts). However, a significant current can leak through the diode 22 to the rail 30 when system is powered down and a positive voltage is present at the pad 28.

Referring to FIG. 2, a block diagram of a conventional N-channel Field Effect Transistor (NFET) ESD circuit 40 is shown. To solve the powered-down leakage problem of the circuit 20, a silicide blocked NFET 42 is used to snap back during an ESD event to protect the circuit 26. Since no current path exists between the pad 28 and the rail 30, current leakage will not occur even when system is powered down. However, the NFET approach is hard to make work and ESD performance is usually poor.

During a positive ESD zap with respect to the rail 32, current goes through silicide blocked NFET 42 directly to the rail 32. For a positive ESD zap with respect to the rails 30 and 32, current goes through NFET 42 to the rail 32, a diode 44 and to the rail 30. During a negative ESD zap with respect to the rail 32, current goes from the rail 32 through a diode 46 to the pad 28. For a negative ESD zap with respect to the rail 30, current goes from the rail 30, through the power clamp 34, the rail 32, the diode 46 and to the pad 28.

Unlike the circuit 20, the circuit 40 has no DC path from the pad 28 to either rail 30 or 32. Therefore, no current leakage issue exists while the rail 30 is powered down. The ESD performance of circuit 40 depends on how fast NFET 42 achieves the snap back mode. Usually the turn on voltage of the NFET 42 is close to 10 volts. Hence, the ESD performance of the circuit 40 is weaker than the circuit 20 for the same device size.

SUMMARY OF THE INVENTION

The present invention concerns an apparatus generally having a first circuit, a second circuit and a third circuit. The first circuit may be configured to selectively switch a bonding pad to (i) a first rail of a power source and (ii) a discharge rail in response to an electrostatic discharge. The second circuit is generally configured to clamp the electrostatic discharge between the discharge rail and the first rail. The third circuit may be configured to bias the discharge rail to a second rail of the power source.

The objects, features and advantages of the present invention include providing a method and/or architecture for an ESD protection scheme for HDMI transmitters that may (i) implement double diode ESD protection, (ii) include an ESD rail separate from the power rails to control leakage while powered off, (iii) filter the ESD rail to AC ground for noise isolation, (iv) be simple to implement, (v) provide effective ESD protection and/or be compatible with the HDMI specification.

BRIEF DESCRIPTION OF THE DRAWINGS

These and other objects, features and advantages of the present invention will be apparent from the following detailed description and the appended claims and drawings in which:

FIG. 1 is a block diagram of a conventional double diode electrostatic discharge circuit;

FIG. 2 is a block diagram of a conventional N-channel Field Effect Transistor electrostatic discharge circuit;

DETAILED DESCRIPTION OF THE PREFERRED EMBODIMENTS

Figure 3:
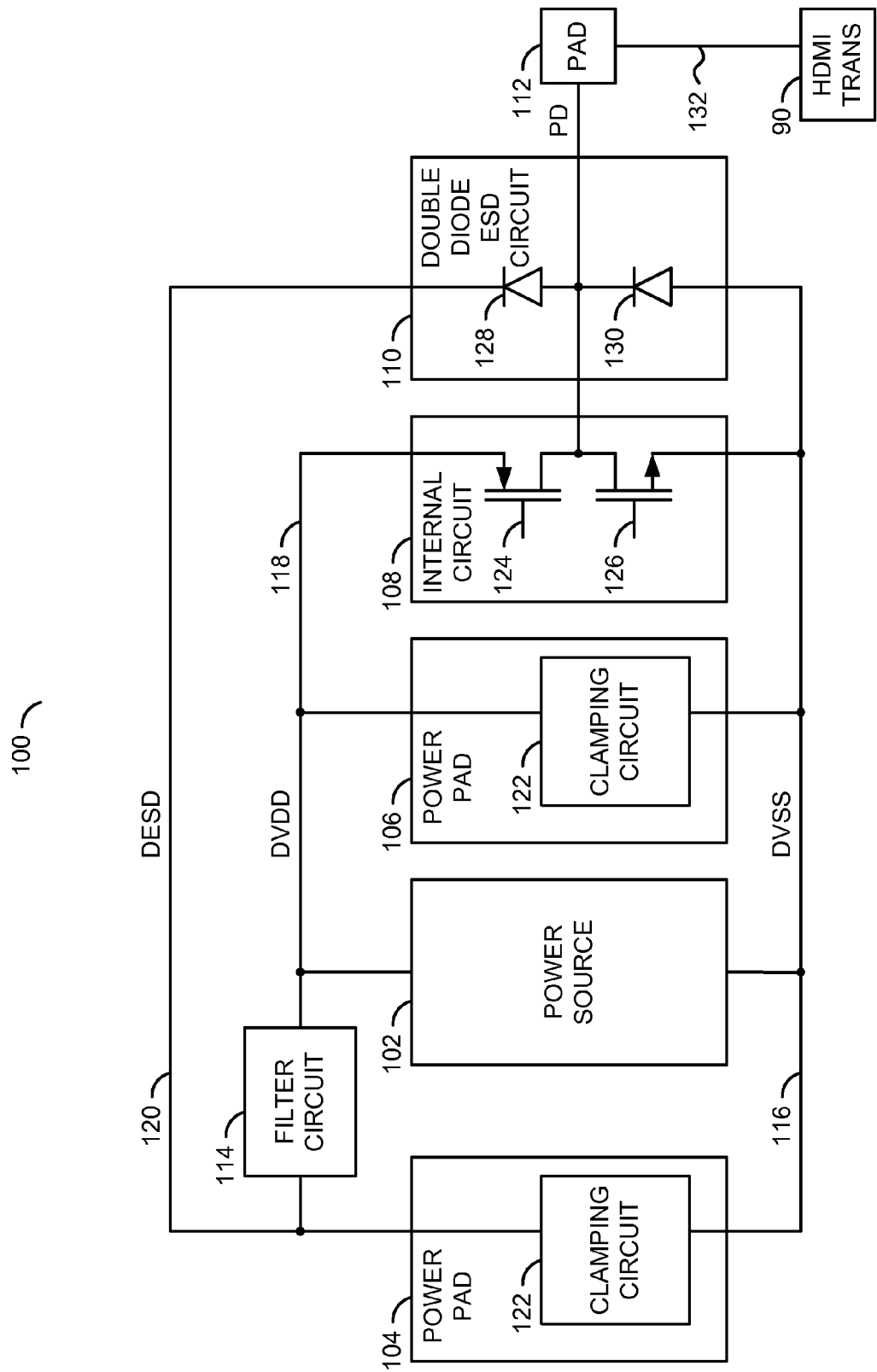
FIG. 3 is a block diagram of an apparatus in accordance with a preferred embodiment of the present invention.

Referring to FIG. 3, a block diagram of an apparatus 100 is shown in accordance with a preferred embodiment of the present invention. The apparatus (or system) 100 generally comprises a circuit (or module) 102, a circuit (or module) 104, a circuit (or module) 106, a circuit (or module) 108, a circuit (or module) 110, a circuit (or module) 112 and a circuit (or module) 114. The circuit 108 is generally implemented in hardware and may include software and/or firmware elements. The circuits 102, 104, 106 and 110 to 114 are generally implemented as only hardware.

A signal (e.g., PD) may be exchanged between the circuits 108, 110 and 112. A rail (or power bus) 116 may be shared by the circuits 102, 104, 106, 108 and 110. Another rail (or power bus) 118 may be shared by the circuits 102, 106, 108 and 114. The circuits 104, 110 and 114 may be coupled together by a rail (or power bus) 120. The circuit 114 may be coupled between the rails 118 and 120.

The circuit 102 may implement a power source. The circuit 102 is generally operational to provide electrical power to the rest of the circuitry in the apparatus 100. The circuit 102 may generate a positive power signal (e.g., DVDD) on the rail 118. A negative or ground power signal (e.g., DVSS) may be generated on the rail 116. While the apparatus 100 is powered up, the signals DVDD and DVSS may provide current to the remaining circuitry.

The circuit 104 may implement a power pad circuit. The circuit 104 is generally operational to perform an ESD clamping between the rails 116 and 120. An ESD pulse or signal may be conveyed between the rails 116 and 120 by a clamping circuit (or module) 122 within the circuit 104.

The circuit 106 may implement a power pad circuit. In some embodiments, the circuit 106 may be a copy of the circuit 104. The circuit 106 is generally operational to perform an ESD clamping between the rails 116 and 118. The ESD pulse may be conveyed between the rails 116 and 118 by another clamping circuit 122 within the circuit 106.

The circuit 108 may implement internal circuitry of the apparatus 100. The circuit 108 may be operational to perform a variety of analog and/or digital functions. In some embodiments, the circuit 108 may be designed in Complementary Metal Oxide Semiconductor (CMOS) technology, as represented by transistors 124 and 126. Other technologies may be implemented in the circuit 108 to meet the criteria of a particular application.

The circuit 110 may be implemented as double diode ESD circuit. The circuit 110 may comprise a diode 128 and a diode 130. The diode 128 may be operational to selectively switch a positive ESD pulse with respect to the signal DVDD between the circuit 112 and the rail 120. The diode 130 may be operational to selectively switch a negative ESD pulse with respect to the signal DVSS between the rail 116 and the circuit 112.

The circuit 112 may implement a bonding pad circuit. The circuit 112 may be an input circuit, an output circuit or an input/output circuit. The circuit 112 may convey the signal PD into and/or out of the apparatus 100. In some embodiments, the circuit 112 may be form part of an interface 132 to an HDMI transmitter 90.

The circuit 114 may implement a filter circuit. The circuit 114 may be operational to transfer a bias voltage (e.g., DESD) from the rail 118 to the rail 120. To achieve the transfer, the circuit 114 may present a high-impedance (e.g., 60 kilo (K) ohms or greater) path between the rails 118 and 120. During an ESD event, the circuit 114 may transfer a resulting ESD current between the rails 118 and 120 along a low impedance AC path (e.g., through a capacitor). The AC path may also reduce parasitic noise coupled to the rail 120.

Consider the apparatus 100 in a HDMI-type environment. When the apparatus 100 is powered down (e.g., DVDD=DVSS=0 volts), a positive voltage applied to the circuit 112 from an HDMI cable may raise the voltage on the rail 120 through the diode 128. The high impedance of the circuit 114 may limit the subsequent leakage current from the rail 120 to the rail 118 to a specified amount. The impedance is generally rated such that the leakage current is below a threshold limit specified by the HDMI specification (published by the High-Definition Multimedia Interface Founders). The apparatus 100 may also meet the 2-kilovolt Human Body Model (HBM) and the 200 volt Machine Model (MM) Joint Electron Devices Engineering Council (JEDEC) ESD criteria. Silicon tests have shown that the structure of the apparatus 100 generally has excellent ESD and electrical performance characteristics.

Figure 4:
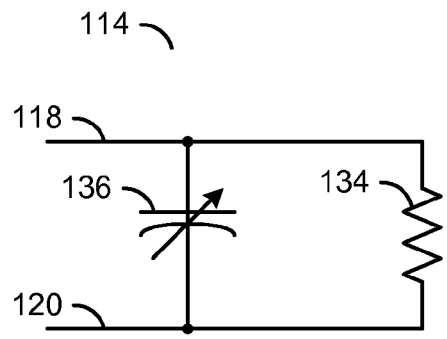
FIG. 4 is a schematic diagram of an example implementation of a filter circuit.

Referring to FIG. 4, a schematic diagram of an example implementation of the circuit 114 is shown. The circuit 114 generally comprises a resistor 134 and a capacitor 136. The resistor 134 and the capacitor 136 may be arranged in parallel to form an RC high-pass filter.

The resistor 134 may be coupled between the rails 118 and 120. The resistor 134 generally provides the high impedance DC path for biasing the rail 120 from the rail 118 (e.g., DESD=DVDD) while the circuit 102 is supplying power. In some embodiments, the resistor 134 may be implemented as an at least 60 Kohm resistor to pass the HDMI CTS 1.3 compliance test. The resistor 134 may be fabricated in a poly-silicon layer of the integrated circuit. Other resistive values and/or fabrication techniques may be implemented to meet the criteria of a particular application.

The capacitor 136 may be coupled between the rails 118 and 120. The capacitor 136 generally provide the AC path for transferring the ESD pulses and noise between the rails 120 and 118. The noise may be created by the parasitic capacitances of the diode 128 causing mutual coupling among the signals in the multi-gigahertz range. All AC signal leakage through the diode 128 may be sunk from the rail 120 through the capacitor 136 to AC ground, thus preventing the AC signal leakage from being coupled to other signals. In some embodiments, the capacitor 136 may be implemented as a 5-picofarad capacitor. The capacitor 136 may be fabricated as a gate capacitance of a MOSFET. Other capacitance values and/or fabrication techniques may be implemented to meet the criteria of a particular application.

An architecture of the apparatus 100 generally includes the dedicated rail 120 and the circuit 114 to improve on existing ESD architectures. The rail 120 is generally kept at high impedance relative to the rails 118, so even if circuit 102 is powered down, current flowing through the diode 128 to the rail 120 is negligible Where implemented in an integrated circuit, the diode 130 (e.g., an n-diffusion into a p-substrate) may connect the circuit 112 to the rail 116 (e.g., the substrate). The diode 128 (e.g., a p-diffusion into an n-well) may connect the circuit 112 to the rail 120. The circuits 122 (e.g., an RC clamp-based ESD circuit) may be built between (i) the rails 120 and 116 and (ii) the rails 118 and 116. In the event of a positive ESD pulse induced in the signal PD, the ESD current generally flows from the circuit 112 through the diode 128 to the rail 120, through the RC clamp of the circuit 104 and finally to the rail 116 (e.g., substrate). In the event of a negative ESD pulse induced in the signal PD, the ESD current comes from the rail 116 (e.g., substrate) through the diode 130 and out the circuit 112. The rail 120 may be separated from the rail 118 by the circuit 114 such that leakage currents between the circuit 112 and the rail 118 are below specified levels.

Figure 5:
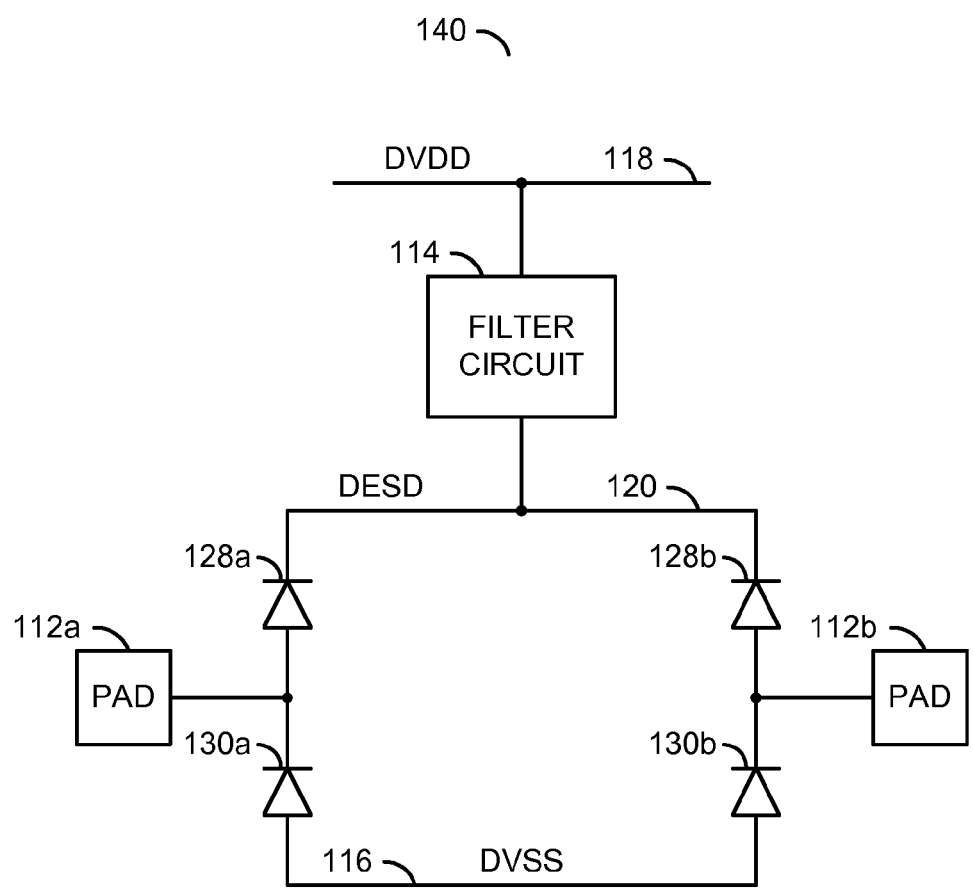
FIG. 5 is a partial block diagram of an example portion of the apparatus.

Referring to FIG. 5, a partial block diagram of an example portion 140 of the apparatus 100 is shown. The portion 140 generally comprises multiple circuits (or modules) 112a-112b, multiple diodes 128a-128b, multiple diodes 130a-130b, the circuit 114, the rail 116, the rail 118 and the rail 120. The circuits 112a-112b are generally implemented only in hardware.

Each circuit 112a-112b may implement a bonding pad circuit. The circuits 112a-112b may be copies of and/or variations of the circuit 112. Each diode 128a-128b may be coupled between the rail 120 and a corresponding circuit 112a-112b in the same manner as the diode 128 is coupled between the rail 120 and the circuit 112. The diodes 128a-128b may be copies of and/or variations of the diode 128. Each diode 130a-130b may be coupled between the rail 116 and the corresponding circuit 112a-112b in the same manner as the diode 130 is coupled between the rail 116 and the circuit 112. The diodes 130a-130b may be copies of and/or variations of the diode 130.

Since some to all of the circuits 112a-112b may share the same rail 120, if the rail 120 is left floating, a signal in a circuit (e.g., 112a) may be coupled to another circuit (e.g., 112b) through the diode junction capacitances of the diodes 128a and 128b. The diode junction capacitances may be significant due to the device size of the diodes 128a and 128b. The circuit 114 may provide a path from the rail 120 to AC ground via the rail 118. The path to AC ground generally suppresses coupled signals to effectively isolate the circuits 112a-112b from each other.

Figure 6:
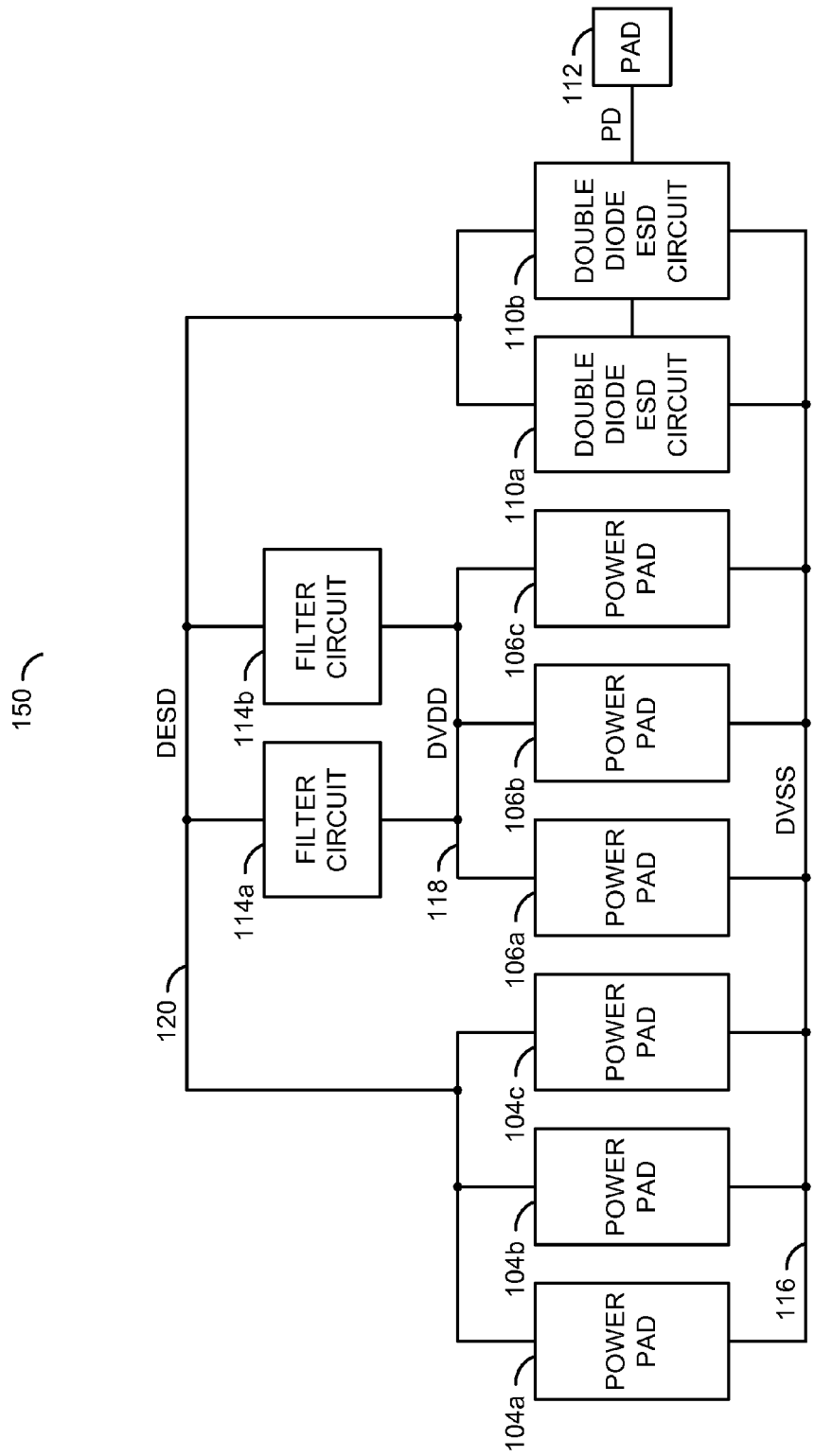
FIG. 6 is a block diagram of another example implementation of an apparatus.

Referring to FIG. 6, a block diagram of another example implementation of an apparatus 150 is shown. The apparatus (or system) 150 may be a variation of the apparatus 100 and/or a portion of the apparatus 100. The apparatus 150 generally comprises multiple circuits (or modules) 104a-104c, multiple circuits (or modules) 106a-106c, multiple circuits (or modules) 110a-110b, the circuit 112, multiple circuits (or modules) 114a-114b, the rail 116, the rail 118 and the rail 120. The circuits 104a to 114b are generally implemented only in hardware.

Each circuit 104a-104b may be a copy of the circuit 104. Each circuit 106a-106b may be a copy of the circuit 106. Each circuit 110a-110b may be a copy of the circuit 110. Each circuit 114a-114b may be a variation of the circuit 114 with each resistor increased in value. In order to increase ESD current handling capabilities, the circuits 104, 106, 110 and/or 114 of the apparatus 100 may be duplicated and wired in parallel in the apparatus 150.

The circuitry described above may be designed, fabricated in hardware and operated. Descriptions of the circuitry may also be created in software and stored in cell libraries for reuse in later design applications. Simulation models may also be created of the circuitry. Such models may be exercised by a simulator to verify proper functionality and performance of the designs. The circuitry and the functions performed by the diagrams of FIGS. 3-6 may be implemented using one or more of a conventional general purpose processor, digital computer, microprocessor, microcontroller, RISC (reduced instruction set computer) processor, CISC (complex instruction set computer) processor, SIMD (single instruction multiple data) processor, signal processor, central processing unit (CPU), arithmetic logic unit (ALU), video digital signal processor (VDSP) and/or similar computational machines, programmed according to the teachings of the present specification, as will be apparent to those skilled in the relevant art(s). Appropriate software, firmware, coding, routines, instructions, opcodes, microcode, and/or program modules may readily be prepared by skilled programmers based on the teachings of the present disclosure, as will also be apparent to those skilled in the relevant art(s). The software is generally executed from a medium or several media by one or more of the processors of the machine implementation.

The present invention may also be implemented by the preparation of ASICs (application specific integrated circuits), Platform ASICs, FPGAs (field programmable gate arrays), PLDs (programmable logic devices), CPLDs (complex programmable logic device), sea-of-gates, RFICs (radio frequency integrated circuits), ASSPs (application specific standard products) or by interconnecting an appropriate network of conventional component circuits, as is described herein, modifications of which will be readily apparent to those skilled in the art(s).

The present invention thus may also include a computer product which may be a storage medium or media and/or a transmission medium or media including instructions which may be used to program a machine to perform one or more processes or methods in accordance with the present invention. Execution of instructions contained in the computer product by the machine, along with operations of surrounding circuitry, may transform input data into one or more files on the storage medium and/or one or more output signals representative of a physical object or substance, such as an audio and/or visual depiction. The storage medium may include, but is not limited to, any type of disk including floppy disk, hard drive, magnetic disk, optical disk, CD-ROM, DVD and magneto-optical disks and circuits such as ROMs (read-only memories), RAMS (random access memories), EPROMs (electronically programmable ROMs), EEPROMs (electronically erasable ROMs), UVPROM (ultra-violet erasable ROMs), Flash memory, magnetic cards, optical cards, and/or any type of media suitable for storing electronic instructions.

The elements of the invention may form part or all of one or more devices, units, components, systems, machines and/or apparatuses. The devices may include, but are not limited to, servers, workstations, storage array controllers, storage systems, personal computers, laptop computers, notebook computers, palm computers, personal digital assistants, portable electronic devices, battery powered devices, set-top boxes, encoders, decoders, transcoders, compressors, decompressors, pre-processors, post-processors, transmitters, receivers, transceivers, cipher circuits, cellular telephones, digital cameras, positioning and/or navigation systems, medical equipment, heads-up displays, wireless devices, audio recording, storage and/or playback devices, video recording, storage and/or playback devices, game platforms, peripherals and/or multi-chip modules. Those skilled in the relevant art(s) would understand that the elements of the invention may be implemented in other types of devices to meet the criteria of a particular application.

While the invention has been particularly shown and described with reference to the preferred embodiments thereof, it will be understood by those skilled in the art that various changes in form and details may be made without departing from the spirit and scope of the invention.

The invention claimed is:

1. An apparatus comprising:
a first circuit configured to selectively switch a bonding pad to (i) a first rail of a power source and (ii) a discharge rail in response to an electrostatic discharge;
a second circuit configured to clamp said electrostatic discharge between said discharge rail and said first rail; and
a parallel RC network configured to transfer noise from said discharge rail to a second rail of said power source, wherein said noise is received by said discharge rail from said first circuit.

2. The apparatus according to claim 1, wherein said bonding pad forms part of an interface compliant with a High-Definition Multimedia Interface specification that establishes a maximum leakage current from said bonding pad to said second rail when said power source is off.

3. The apparatus according to claim 1, further comprising a fourth circuit configured to clamp said electrostatic discharge between said second rail and said first rail, wherein said fourth circuit copies a performance of said second circuit.

4. The apparatus according to claim 1, wherein said parallel RC network transfers a bias from said second rail to said discharge rail through a DC path.

5. The apparatus according to claim 1, wherein said parallel RC network couples said discharge rail to said second rail through an AC path.

6. The apparatus according to claim 1, further comprising a fourth circuit having (i) a signal interface coupled to said bonding pad and (ii) a plurality of power interfaces that receive power from said second rail and said first rail.

7. The apparatus according to claim 1, wherein said first circuit comprises a first diode configured to couple said bonding pad to said discharge rail while forward biased.

8. The apparatus according to claim 7, wherein said first circuit further comprises a second diode configured to couple said bonding pad to said first rail while forward biased.

9. The apparatus according to claim 1,
further comprising a plurality of said second circuits wired in parallel.

10. The apparatus according to claim 1, further comprising a plurality of fourth circuits wired in parallel, wherein each of said fourth circuits is configured to clamp said electrostatic discharge between said second rail and said first rail.

11. A method for electrostatic discharge protection of an apparatus, comprising the steps of:
(A) selectively switching a bonding pad of said apparatus to (i) a first rail of a power source and (ii) a discharge rail in response to an electrostatic discharge;
(B) clamping said electrostatic discharge between said discharge rail and said first rail; and
(C) transferring noise from said discharge rail to a second rail of said power source through a parallel RC network, wherein said noise is received by said discharge rail from said selectively switching.

12. The method according to claim 11, wherein said bonding pad forms part of an interface compliant with a High-Definition Multimedia Interface specification that establishes a maximum leakage current from said bonding pad to said second rail when said power source is off.

13. The method according to claim 11, further comprising the step of:
clamping said electrostatic discharge between said second rail and said first rail, wherein said clamping of said second rail copies a performance of said clamping of said discharge rail.

14. The method according to claim 11, wherein said parallel RC network transfers a bias from said second rail to said discharge rail through a DC path.

15. The method according to claim 11, wherein said parallel RC network couples said discharge rail to said second rail through an AC path said.

16. The method according to claim 11, further comprising the steps of:
communicating between a signal interface of a circuit of said apparatus and said bonding pad; and
receiving power at a plurality of power interfaces of said circuit from said second rail and said first rail.

17. The method according to claim 11, wherein said selectively switching of said bonding pad to said discharge rail comprises forward biasing a first diode.

18. The method according to claim 17, wherein said selectively switching of said bonding pad to said first rail comprises forward biasing a second diode.

19. The method according to claim 11, wherein said clamping of said electrostatic discharge between said discharge rail and said first rail comprises a plurality of said clampings operating in parallel.

20. An apparatus comprising:
means for selectively switching a bonding pad of a circuit to (i) a first rail of a power source and (ii) a discharge rail in response to an electrostatic discharge;
means for clamping said electrostatic discharge between said discharge rail and said first rail; and
a parallel RC network configured to transfer noise from said discharge rail to a second rail of said power source, wherein said noise is received by said discharge rail from said means for selectively switching.

* * * * *